Figure 1:
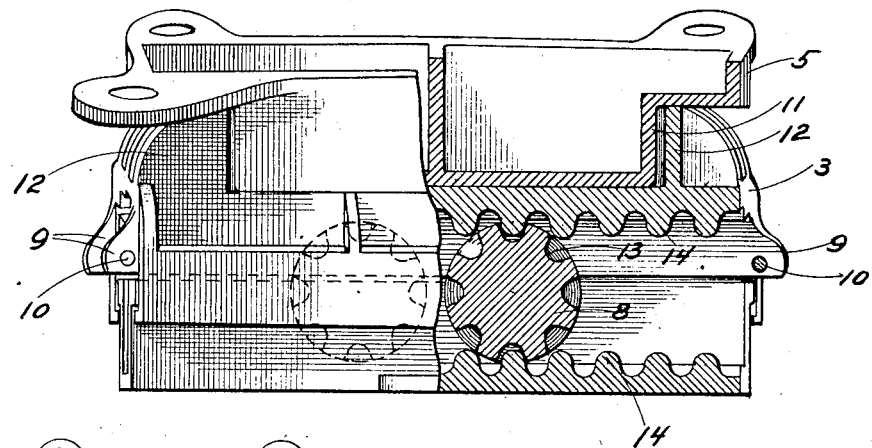

W. WHITE.
SIDE BEARING.
APPLICATION FILED OCT. 29, 1908.

1,118,984.

Patented Dec. 1, 1914.

Witnesses:
C. E. Burns
Lillian Kelly

Inventor:
William White
By Sheridan & Williamson
Atty's

UNITED STATES PATENT OFFICE.

WILLIAM WHITE, OF CHICAGO, ILLINOIS.

SIDE BEARING.

1,118,984. Specification of Letters Patent. Patented Dec. 1, 1914.

Application filed October 29, 1908. Serial No. 460,047.

*To all whom it may concern:*

Be it known that I, WILLIAM WHITE, a citizen of the United States, residing at Chicago, in the county of Cook and State of Illinois, have invented certain new and useful Improvements in Side Bearings, of which the following is a specification.

The object of my invention is to provide an anti-friction side bearing for railway cars.

As is well-known, it is highly desirable to provide means for permitting the bodies of railway cars to swivel freely upon the trucks. Frictional resistance to such free swiveling, such as results from the use of the friction side bearings now commonly employed, causes injurious strains upon the wheels, and increases the pull necessary to move trains over curves and produces other injurious effects. It has heretofore been proposed to interpose rollers between the body and truck bolsters in place of the usual friction side bearings. The simple introduction of rollers, however, has failed to solve the problem, for the reason that the upper and lower members of side bearings do not always contact, owing to the initial clearance and to the tipping of the car bodies. Such sidewise tipping results from the fact that the elevation of the outside rails upon curves is adjusted necessarily to accommodate one speed only. When a car is moved at a rate above this predetermined speed, the outer bearing will close together and the inner one will open, and when a car is moved at a speed below that for which the curve is banked, the inner bearings will close and the outer ends open. The use of roller, or anti-friction side bearings, if a satisfactory degree of efficiency is to be secured, necessitates the employment of some means for keeping the roller in proper relation to the upper and lower bearing surfaces. Assuming that conditions are such that a roller side bearing closes upon the roller and the car body turns upon the truck, thus displacing the roller from its central position, and that, due to a variation in speed or other cause, the bearing then opens and the car body continues to turn in the same or the opposite direction with reference to the truck, and then closes again upon the roller, the latter will not occupy the proper position relative to the upper and lower bearing surfaces. In this manner the rollers may become moved to their extreme limit in one direction, and the next ensuing turning movement of the car body upon the truck may be in the direction to move the roller still farther in the same direction. But as the roller can move no farther in this direction, the swiveling movement of the car body will be effected by sliding over the stationary roller, thus resulting in the friction encountered in ordinary friction bearings, and in addition flattening the roller to such an extent eventually as to render it useless as an anti-friction device. It has also been proposed to introduce means whereby the anti-friction roller will, through the use of inclined bearing surfaces or springs, return to its central position whenever the side bearing opens, thus releasing the roller. Such devices, however, do not obviate the difficulty, for the reason that after the roller has been centered the bearing may close, after the car has entered upon a curve, and under such circumstances, while the roller will be centered with respect to the lower bearing surface upon the truck bolster, its point of contact with the upper bearing surface on the body bolster will be at some distance from the center thereof. The continued turning of the car body upon the truck may thus result in carrying the roller to the limit of its movement as determined by the stop necessarily employed, thus resulting in the slipping of the upper bearing surface over the non-rotating roller.

Among other advantages inherent in my improved side bearing is the fact that the antifriction roller moves with the body bolster, whether the latter is bearing upon the roller or not; *i. e.*, whenever the car body rotates upon the truck, the roller follows the movement of the car body and hence the rollers maintain their proper relation to the upper and lower bearing surfaces, regardless of whether they are or are not maintaining the weight of the car body.

Other and further advantages resulting from my improved structure will appear from the following description and claims, taken in connection with the accompanying drawing.

Figure 3:
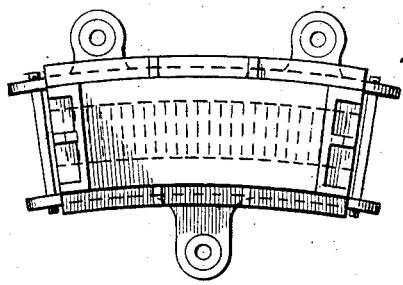
Figure 2:
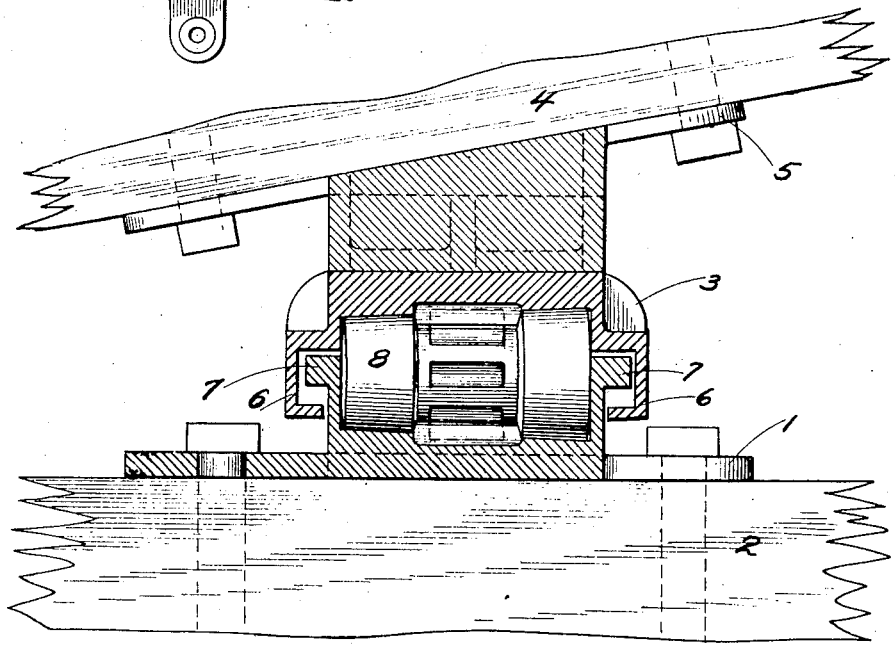

In the drawing—Figure 1 is a partially sectional view in elevation of my improved side bearing. Fig. 2 is a cross sectional view in elevation. Fig. 3 is a plan view with the driver removed on a reduced scale.

My improved side bearing comprises a lower bearing member 1 secured to the truck bolster 2 and an upper bearing member 3, which is not rigidly attached to any part of the car structure. Fixed to the body bolster 4 is a driver 5. The upper bearing plate, or traveler, is provided upon each of its longitudinal sides with downwardly and inwardly projecting lips 6, and the lower bearing plate is provided with longitudinal sides at the upper edges of which are outturned lips 7. The upper and lower bearing plates are assembled by slipping them together endwise with the lips 6 in engagement with the shoulders 7, which permits free endwise movement of the two bearing plates relative to each other. Prior to assembling the upper and lower bearing plates, the roller or rollers 8 are placed in position upon the lower bearing plate, so that after assemblage the parts occupy the position shown in Fig. 1. The upper bearing plate is provided at its ends with projecting lugs 9 and stop rods 10, one of which is inserted after the parts are assembled, and serve to hold the rollers in place and to prevent the upper and lower bearing plates from becoming separated in case the device is assembled before being placed on a car, or in case the truck is separated from the car body.

The driver 5 is provided with a downward projection or lug 11, which is received between two upwardly projecting lugs 12 adjacent the ends of the upper bearing plate 3. The parts are so proportioned that the tilting of the body of the car will never be sufficient to disengage the downward projection or lug 11 from the shoulders 12 on the bearing plate 3. Thus at all times the bearing plate 3 will be compelled to follow the rotative movement of the car body upon its center bearing. While the bearing plate 3 is thus compelled to follow the horizontal movement of the car body, the latter in its tilting movement leaves the bearing plate undisturbed in its relation to the roller 8, and accidental vertical displacement of the bearing plate 3 is prevented by the engagement of the lips 6 with the shoulders 7 upon the lower bearing plate.

In order to provide positive means for compelling the roller 8 to maintain its proper relation to the upper and lower bearing plates, I provide these parts with intermeshing teeth, such teeth taking the form of cavities 13 in the roller located midway its ends and extending through a portion of its length. The teeth upon the bearing plates 1 and 3 are formed partially above and partially below the bearing surface thereof and are of a length to correspond with the length of the teeth upon the roller 8. The cavities 13 in the roller 8 and the spaces between the teeth 14 upon the upper and lower bearing plates are of sufficient depth to prevent contact between the outer ends of the teeth and the inner ends of the spaces between the teeth, the entire pressure imposed upon the side bearing thus being carried by the smooth conical surfaces of the roller and bearing plates.

Obviously, the engaging shoulders of the driver 5 and upper bearing plate 3 may take other forms than that specifically shown, the essential characteristic being that the upper bearing plate 3 be compelled to move horizontally with the body bolster while leaving the body bolster free to move vertically away from the upper bearing plate without disturbing the relation of the latter to the roller 8 and lower bearing plate 14.

From the foregoing it will be apparent that the upper and lower bearing plates are always in engagement with the roller 8, that positive means are provided for causing the roller 8 to rotate whenever there is a relative turning movement between the upper and lower bearing plates, and that while the body bolster and car are free to tilt without disturbing the relation between the bearing plates and roller the upper bearing plate is compelled to follow the turning movement of the car body upon the truck. Furthermore, my improved side bearing may be adjusted, if desired, to fit without vertical clearance between the bearing plates, rollers and driver, thus avoiding the objections incident to the present attempt to leave just sufficient clearance to take up the deflection of the bolsters under full load for the purpose of avoiding excessive side bearing friction.

I claim:

1. In a device of the class described, a truck bolster, a body bolster, an upper bearing plate movable vertically relative to said body bolster, means for preventing a horizontal movement of said upper plate relative to said body bolster, a lower bearing plate fixed to said truck bolster, rollers between and adapted to roll upon said bearing plates, flanges upon said upper and lower bearing plates against which the ends of said rollers abut, interengaging gear teeth upon the central part of said rollers and said bearing plates, and means removably attached to one of said plates in the path of said rollers to limit endwise movement and to prevent displacement of said rollers from between said plates.

2. In a device of the class described, a truck bolster, a body bolster, an upper bearing plate movable vertically relative to said body bolster, means for preventing a horizontal movement of said upper plate relative to said body bolster, a lower bearing plate fixed to said truck bolster, rollers between and adapted to roll upon said bearing plates, flanges upon said upper and lower bearing plates against which the ends of said rollers abut, interengaging gear teeth upon the central part of said rollers and said bearing plate, the teeth in said rollers lying inside of the outer bearing surfaces thereof, and means removably attached to one of said plates in the path of said rollers to limit endwise movement and to prevent displacement of said rollers from between said plates.

In testimony whereof, I have subscribed my name.

WILLIAM WHITE.

Witnesses:
 ANNA L. WALTON,
 LILLIAN A. KIBBY.